United States Patent [19]

Gregory

[11] Patent Number: 4,735,048

[45] Date of Patent: Apr. 5, 1988

[54] HYDRAULIC TOOL

[75] Inventor: Jack T. Gregory, Penngrove, Calif.

[73] Assignee: The Gregory Company, Menlo Park, Calif.

[21] Appl. No.: 922,940

[22] Filed: Oct. 24, 1986

[51] Int. Cl.[4] ........................ B21J 15/34; F16D 31/02

[52] U.S. Cl. ........................................ 60/478; 417/443; 417/510; 417/511

[58] Field of Search ........................ 417/443, 511, 510; 60/478, 479

[56] References Cited

U.S. PATENT DOCUMENTS

| | | | |
|---|---|---|---|
| 3,867,072 | 2/1975 | Brenneman | 417/511 |
| 4,102,611 | 7/1978 | Broker | 417/457 X |
| 4,263,801 | 4/1981 | Gregory | 60/479 X |
| 4,498,293 | 2/1985 | Gregory | 60/478 |

*Primary Examiner*—Edward K. Look
*Attorney, Agent, or Firm*—Melvin R. Stidham

[57] ABSTRACT

The hydraulic tool of this invention includes a pressure chamber into which a fluid is pumped. A pump chamber has an inlet port and outlet port at opposite ends thereof and a pump plunger extends into the chamber with an annular space around it. An annular shoulder is provided on either the chamber or the plunger and a seal ring or sleeve fits slidably on the other component to seal against the shoulder. A spring biases the seal ring against the shoulder, and when the pump is extended to force fluid out the outlet port, the pressure in the chamber augments the spring force. Then, when the rod is retracted to create a void, fluid in the reservoir forces the seal ring or sleeve away from the seat surface to enter the inlet port.

10 Claims, 2 Drawing Sheets

HYDRAULIC TOOL

BACKGROUND OF THE INVENTION

Previous hydraulic tools I have developed are provided with self-contained pumps to provide the necessary pressurized fluid. Such pumps may be hand operated, as in the Hydraulic Riveter shown in my U.S. Pat. No. 4,263,801 granted Apr. 28, 1981, or they may be motor driven, as in the Hydraulic Log Splitter of my U.S. Pat. No. 4,498,293 dated Feb. 12, 1985. In operation of such tools, a pump plunger is retracted to draw hydraulic fluid radially inward from a surrounding reservoir and through a spring-biased, highly finished ball check valve into a pump chamber. Then, when the pump rod is extended, the fluid is projected into a pressure chamber within a cylinder. While such tools have been extremely effective, they can be made even more compact and at less cost if the inlet ball check valves could be replaced by simpler devices.

OBJECTS OF THE INVENTION

It is an object of this invention to provide a hydraulic tool that is compact and relatively inexpensive to manufacture.

It is a further object of this invention to provide a hydraulic tool with a combined pump rod seal and inlet check valve.

Other objects and advantages of this invention will become apparent from the description to follow, particularly when read in conjunction with the accompanying drawings.

SUMMARY OF THE INVENTION

In carrying out this invention, a hydraulic tool is provided with a pump chamber having inlet and outlet ports at opposite ends thereof. In one embodiment, a pump rod extends freely through the inlet port so that there is a clearance around it that functions as an inlet port. The port is normally closed by a spring-biased sleeve that has a smooth bore therethrough to seal around the pump rod. When the pump rod is extended, the increased pressure in the chamber biases the sleeve more firmly against the valve seating surface. When the plunger is retracted, it creates a void, whereby fluid from the reservoir forces the sleeve away from the seat, to enter the pump chamber and fill the void.

In another embodiment, a generally radial surface or shoulder is provided around the pump plunger, and an annular seal member slides on, and seals against, the inner wall of the pump chamber, downstream of the inlet ports. A spring biases the seal member against the shoulder to seal off the inlet ports. When the pluner is extended in a working stroke, the increased fluid pressure in the chamber augments the spring force to press the seal firmly against the shoulder, but when the plunger is retracted, it creates a void, allowing reservoir fluid to overcome the spring, forcing the seal away from the shoulder and allowing entry of more fluid around the plunger.

DESCRIPTION OF PREFERRED EMBODIMENTS

Figures 1, 2:
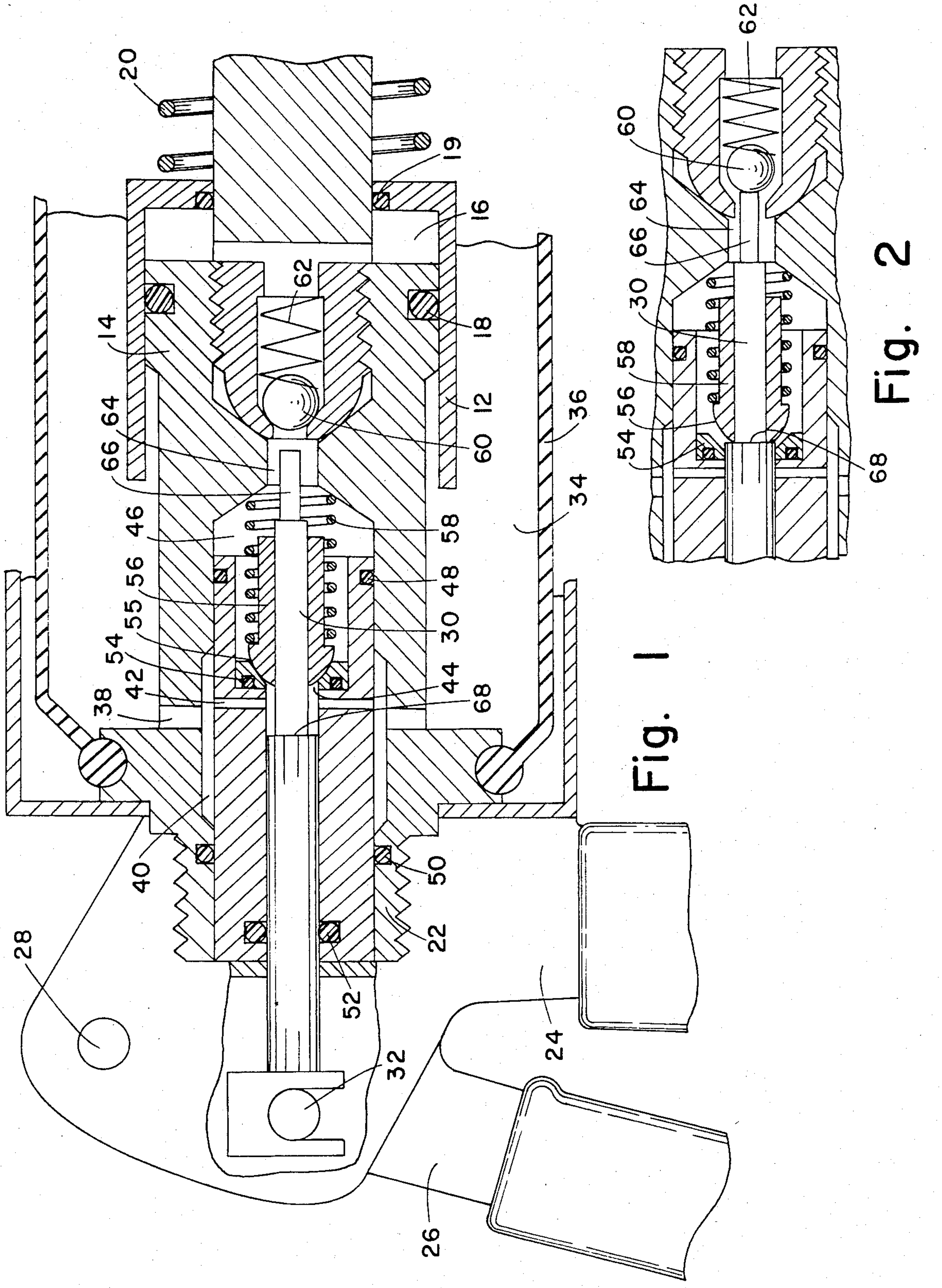
FIG. 1 is a partial section view of a hydraulic hand tool embodying features of this invention.
FIG. 2 is a partial section view of the tool of FIG. 1 showing how the pressure chamber is exhausted.

The Embodiment of FIGS. 1 and 2

In this embodiment, a hydraulic hand tool, such as a riveter of the type shown in my previous U.S. Pat. No. 4,263,801, includes a cylinder 12 that is slidable on a piston 14. A pressure chamber 16 within the cylinder 12 is sealed off by O-rings 18 and 19 so that hyraulic pressure within the pressure chamber 16 forces the cylinder outward against the action of a strong spring 20. The piston 14 is fixed at 22 to a stationary handle 24, and a movable handle 26 is pivoted at 28 to the stationary handle 24 to drive a pump rod 30, which is pinned to the movable handle at 32.

Hydraulic fluid from an annular reservoir 34, which is formed by an elastomer sleeve 36 surrounding the piston 14 and cylinder 12, is delivered through supply ports 38 to a supply manifold 40 and then through a series of inlet ducts 42 to an inlet port 44 that carries the hydraulic fluid into a pump chamber 46. The supply manifold 40 is sealed off by O-rings 48 and 50, and a suitable seal 52 is provided around the plunger rod 30. Seated within the pump chamber 46 at the upstream end is a valve seat ring 54, and engaged with the seat ring is the valve end 55 of a seal sleeve 56. The sleeve 56 is smoothly bored to fit snugly but slidably around the valve plunger rod 30 so as to seal around the plunger rod as it reciprocates within the pump chamber 46. The seal sleeve 56 is biased by a spring 58 so that the valve plug end 55 normally seats against the valve seat ring 54. A one-way ball check valve 60 biased by a spring 62 enables flow through an outlet port 64 from the pump chamber 46 to the pressure chamber 16.

It is apparent that when the pump chamber 46 is full of fluid, and the plunger rod 30 is extended from the position shown in dotted lines, the pressurized fluid will unseat the check valve 60 to discharge through the outlet port 64 to the pressure chamber 16, forcing the cylinder 12 toward the right against the spring 20. Then, when the plunger rod is retracted, while still within the sleeve 56, a void is created in the pump chamber 46, enabling fluid to flow from the reservoir 34 through the inlet port 44, whereby the seal sleeve 56 acts in the nature of a check valve to enable one-way flow. When the pump chamber 46 is filled and pressures are equalized, the sleeve valve 56 will again be seated by the spring 58. Subsequent extension of the plunger rod 30 again builds up pressure in the pump chamber 46 to augment the spring force and hold the sleeve 56 firmly against the valve seat 54.

When the working stroke of the cylinder 12 is completed, the pressure chamber 16 may be exhausted by extending the plunger rod 30 an increment beyond its normal pressure stroke to the position shown in FIG. 2 whereby a probe 66 on the end of the plunger rod 30 unseats the outlet ball check valve 60 and a shoulder 68 on the plunger rod 30 unseats the seal sleeve 56 from the valve seat 54, allowing the pressure chamber 16 to exhaust to the pump chamber 46 and then out ports 42 and 38 to the resevoir 34.

Figure 4:
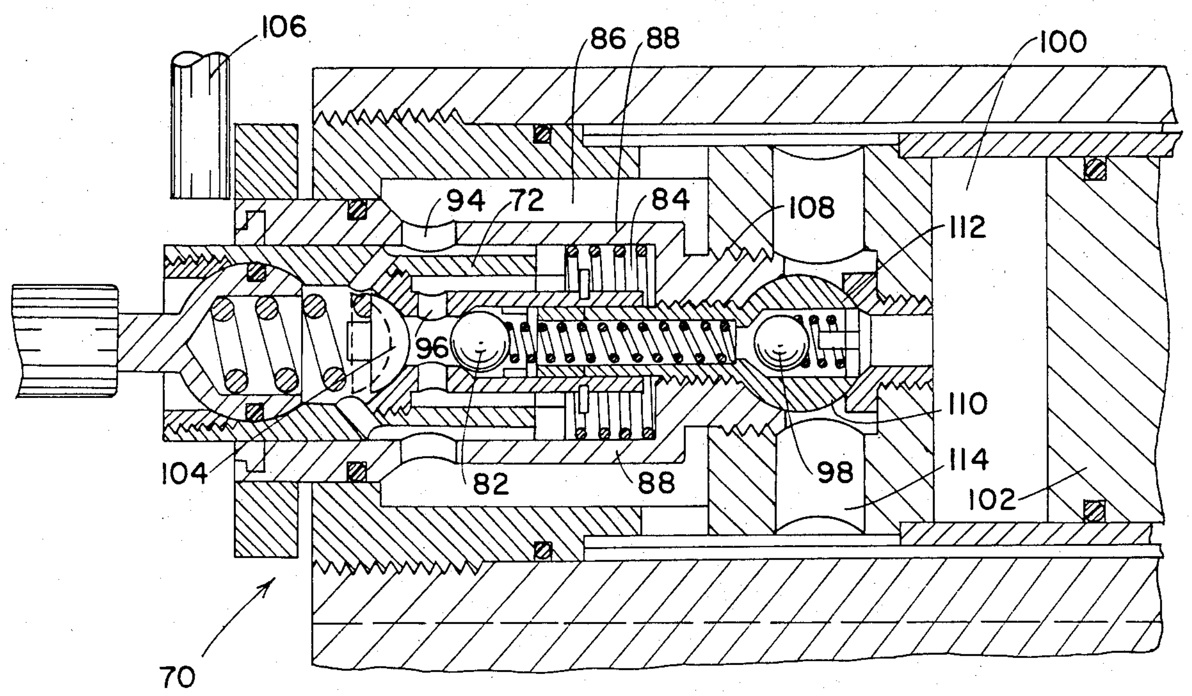
FIGS. 3 and 4 are partial section views of another embodiment of this invention.
Figure 3:
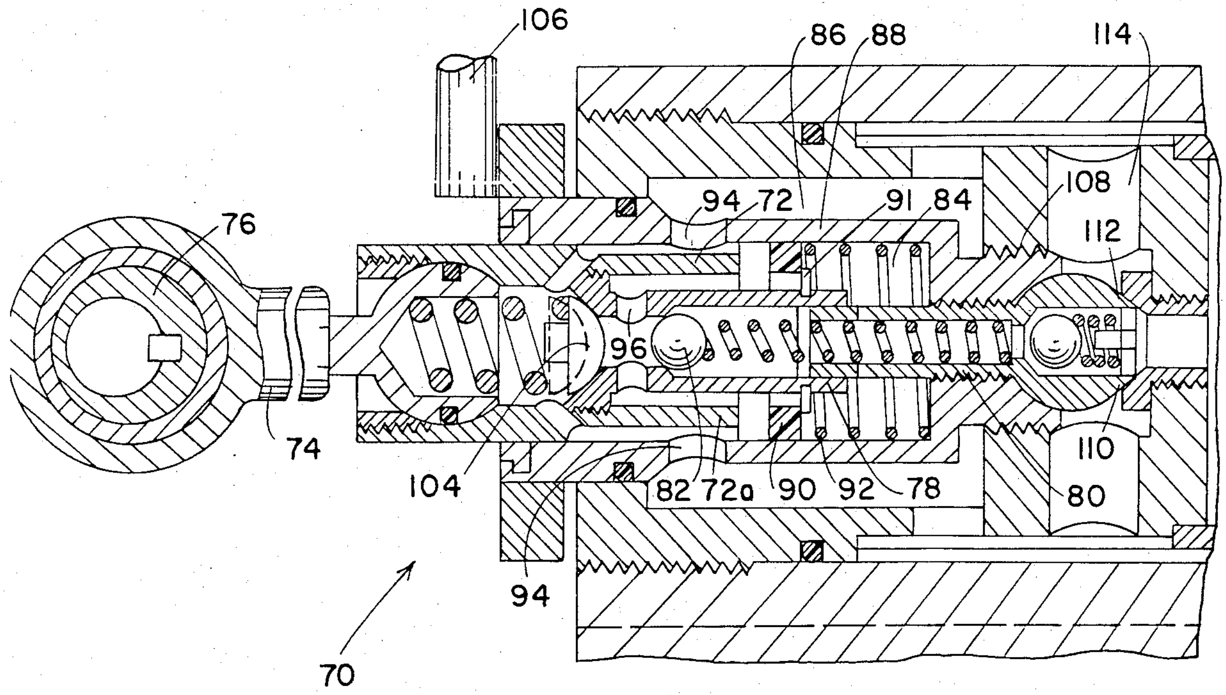

The Embodiment of FIGS. 3 and 4

The pump 70 of this embodiment is of the type shown in my previous U.S. Pat. No. 4,498,293 for a "Hydraulic Log Splitter." It includes a cup-like plunger 72 that is reciprocated at a rapid rate by a pumping rod 74 eccentrically driven at 76 by a motor or engine (not shown). Extending from the cup-like plunger 72 is a tubular extension 78 that slides on a guide sleeve 80. A power ball check valve 82 prevents reverse flow from the tubular extension.

When, after completion of a stroke, the plunger 72 is retracted to the position shown in FIG. 3, a void is created in the pump chamber 84, allowing fluid in the reservoir 86 surrounding the cylinder 88 to force the seal ring or sleeve 90 back away from the annular end or shoulder 72*a* of the plunger 72 against the force of the spring 92. This allows fluid to enter through the ports 94 filling the chamber 84 and then flowing through the ports 96 and past the ball check valve 82 to fill the guide tube 80. Retractive movement of the seal ring 90 is limited by the stop 91 to ensure that the seal ring valve 90 will return quickly under pressure. When the chamber 84 is filled, and pressure is equalized, the spring 92 will again force the seal ring 90 against the annular end 72*a* of the cup-like plunger 72 to seal off the chamber 84, as shown in FIG. 4. Then, when the plunger 72 is extended as shown in FIG. 4, the increased pressure within the chamber 84 augments the force of the spring 92 to seal the ring 90 more firmly against the shoulder or annular surface of the plunger 72, as fluid is driven past the ball check valve 82 and outlet ball check 98 and into the cylinder 100 to drive the piston 102.

In the event that severe resistance is encountered by the piston 102 and pressure builds up in the cylinder 100, the ball check valve 82 is pressed firmly against its seat to prevent flow of fluid to the guide tube 80. In that event, the pressure within the chamber 84 will be forced against the relief valve 104 to move it back to the position shown in dotted lines in FIG. 4, relieving the chamber 84 to the reservoir 86.

When the piston 102 has completed its working stroke, an arm 106 is turned to rotate the pump body 88 partially and retract it where threaded into the tool 70 at 108. This backs the spherical hose 110 from its seat 112 to exhaust the cylinder 100 through ports 114.

While this invention has been described in conjunction with preferred embodiments thereof, it is obvious that modifications and changes therein may be made by those skilled in the art to which it pertains without departing from the spirit and scope of this invention, as defined by the claims appended hereto.

What is claimed as invention is:

1. A hydraulic force-delivering tool including a cylinder, a piston slidable in said cylinder and a hydraulic pump to deliver fluid under pressure to said cylinder said hydraulic pump comprising:
- a pump body;
- means forming a cylindrical chamber in said pump body;
- at least one inlet port opening into one end of said chamber from outside said body;
- means forming an outlet port at the other end of said chamber;
- a check valve in said outlet port enabling outward flow only;
- a pump rod plunger reciprocable through a given stroke in said chamber;
- inner and outer concentric cylindrical surfaces in said chamber and on said plunger, respectively;
- an annular shoulder on said chamber inner cylindrical surface facing toward said other end of the chamber;
- an annular seal member slidable along said pump rod and conditioned to seal against said shoulder; and
- spring means biasing said seal member toward said shoulder.

2. The hydraulic tool defined by claim 1 wherein:
- said pump rod extends through said inlet port; and
- said annular shoulder surrounds said inlet port.

3. The hydraulic tool defined by claim 2 including:
- selectively operated means for relieving fluid pressure in said cylinder.

4. The hydraulic tool defined by claim 3 wherein said last-named means comprises:
- means on said pump rod operative when said pump rod is extended beyond said given stroke to push said annular seal member from said shoulder and said check valve from said outlet port.

5. The hydraulic tool defined by claim 1 including:
- means limiting sliding movement of said seal member away from said shoulder.

6. A hydraulic tool comprising:
- a body;
- means forming a pump chamber in said body;
- a reservoir;
- an inlet port opening into said pump chamber from said reservoir;
- means forming a pressure chamber in said body;
- an outlet port opening from said pump chamber to said pressure chamber;
- a one-way check valve in said outlet port normally enabling flow in one direction only from said pump chamber to said pressure chamber;
- a pump rod reciprocable in said body and extending through said inlet port into said pump chamber;
- said pump rod being reciprocable through a given stroke;
- a valve seating surface around said inlet port within said pump chamber;
- a sleeve within said pump chamber snugly but slidably receiving said pump rod to seal around said pump rod;
- a valve sealing surface on the upstream end of said sleeve engageable with said seating surface to seal off said inlet port; and
- spring means in said pump chamber biasing said sleeve toward said seating surface.

7. The hydraulic tool defined by claim 6 including:
- selectively operated valve means for opening said pressure chamber to said reservoir.

8. The hydraulic tool defined by claim 7 wherein said last-named means comprises:
- means on said pump rod operative when said pump rod is extended beyond said given stroke to push said sleeve from said seating surface and said one-way check valve from said outlet port.

9. A hydraulic pump comprising:
- a pump body;
- means forming a cylindrical chamber in said pump body;
- at least one inlet port opening into one end of said chamber from outside said body;
- means forming an outlet port at the other end of said chamber;
- a check valve in said outlet port enabling outward flow only;
- a pump rod plunger reciprocable through a given stroke in said chamber;
- inner and outer concentric cylindrical surfaces in said chamber and on said plunger, respectively;

an annular shoulder on said chamber inner cylindrical surface facing toward said other end of the chamber;

an annular seal member slidable along said pump rod and conditioned to seal against said shoulder; and spring means biasing said seal member toward said shoulder.

10. The hydraulic pump defined by claim 9 wherein: said pump rod extends through said inlet port; and said annular shoulder surrounds said inlet port.

* * * * *